Sept. 26, 1939.  D. D. WAY  2,174,297
UNITARY ELECTRICAL SYSTEM FOR SEWING MACHINES
Filed Sept. 29, 1938  2 Sheets-Sheet 1
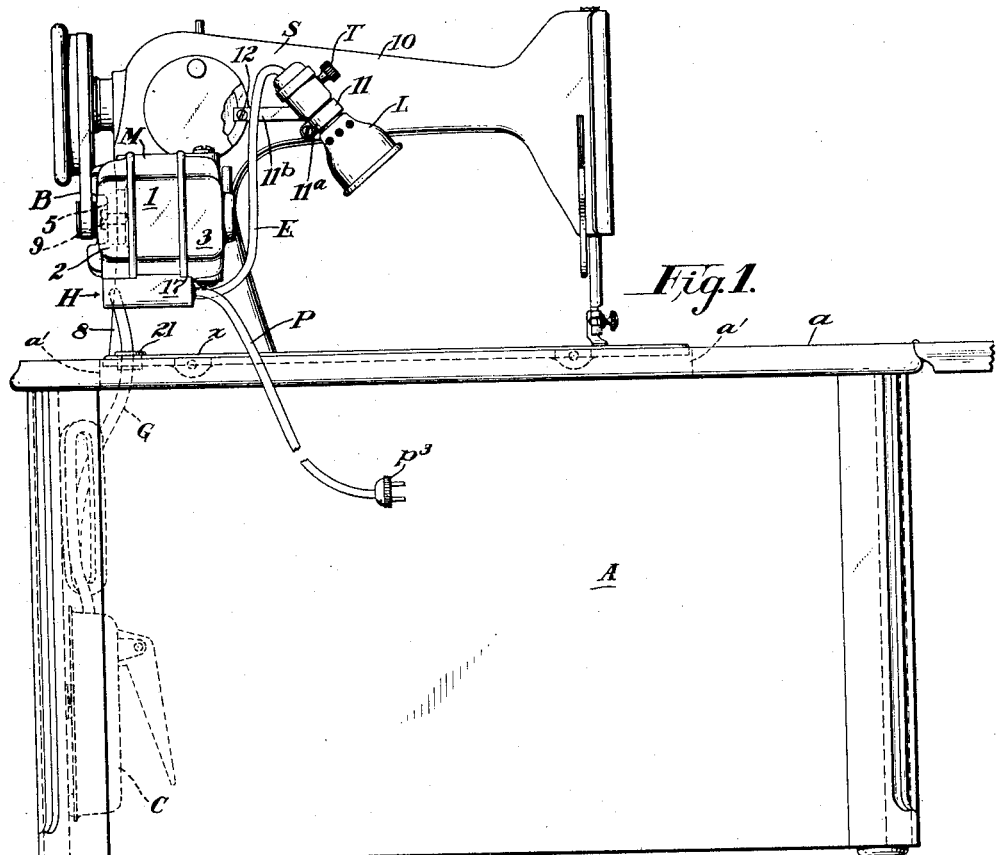
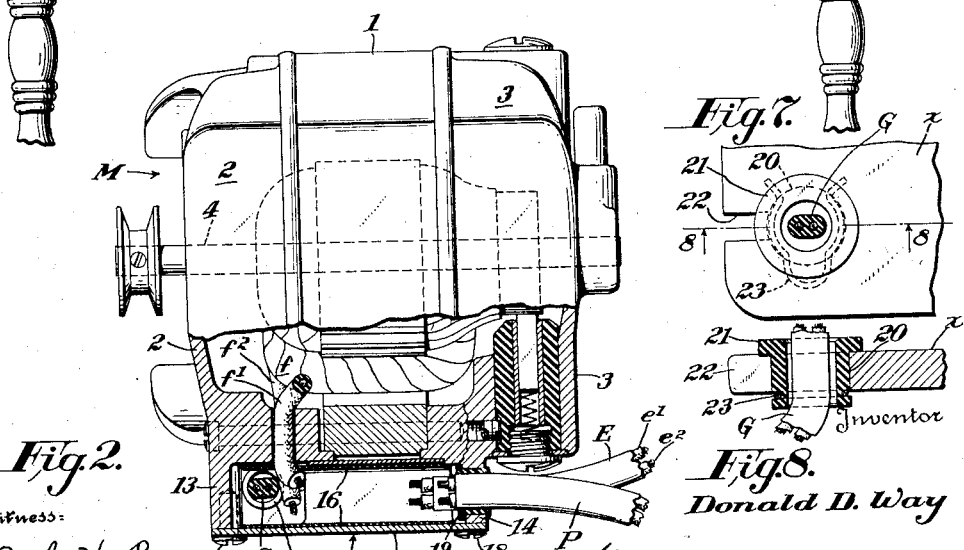
Donald D. Way Sept. 26, 1939. D. D. WAY 2,174,297
UNITARY ELECTRICAL SYSTEM FOR SEWING MACHINES
Filed Sept. 29, 1938 2 Sheets-Sheet 2
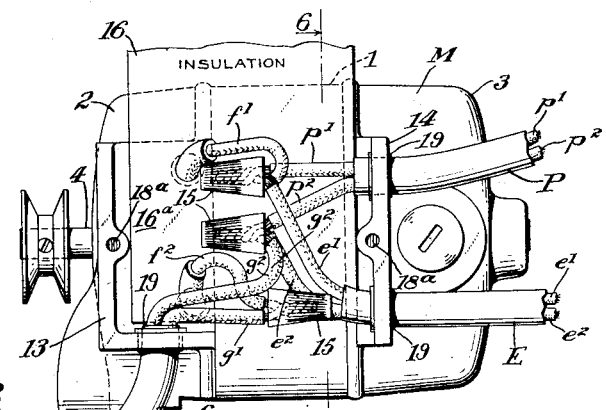
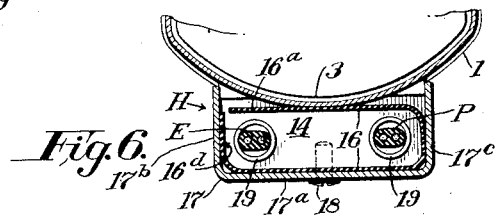
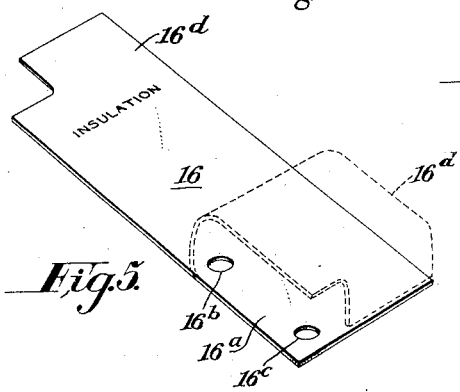
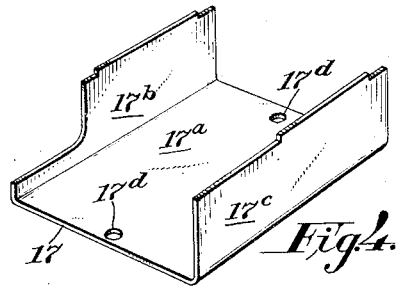
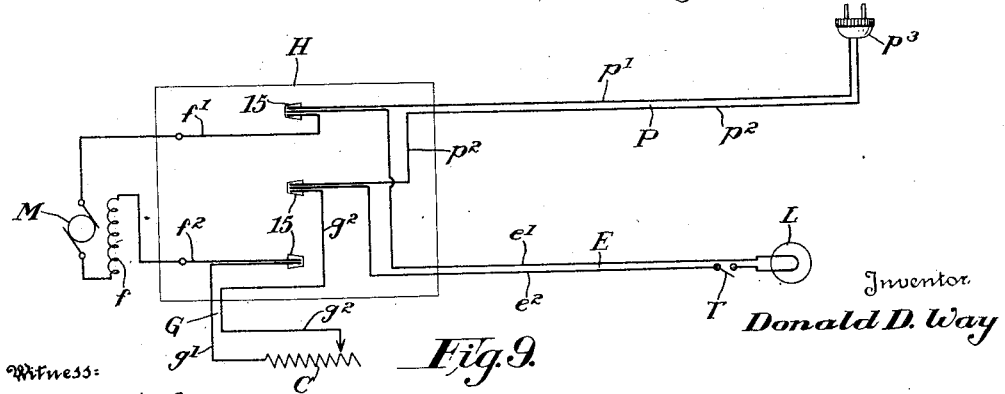
Inventor
Donald D. Way
By Henry J Miller
Attorney
Witness:
John N. Cave Patented Sept. 26, 1939

2,174,297

UNITED STATES PATENT OFFICE 2,174,297

UNITARY ELECTRICAL SYSTEM FOR SEWING MACHINES

Donald D. Way, Elizabeth, N. J., assignor to The Singer Manufacturing Company, Elizabeth, N. J., a corporation of New Jersey Application September 29, 1938, Serial No. 232,300

8 Claims. (Cl. 172—36)

This invention relates to electrically operated sewing machines and it has as an object to provide a simple, composite combination of machine driving motor, motor-controller and illuminating lamp adapted to be assembled as a unit and attached to a sewing machine, after the machine has been otherwise completely assembled.

In sewing machines, as heretofore constructed, the connecting together of the driving motor, the motor-controller and the illuminating lamp and the connecting of those elements to a suitable source of power has involved a rather complicated and costly system of wiring and electrical connections, usually including a two-part separable terminal-block located apart from all the other elements and to which the elements and a lead-in conductor from a source of power are connected by suitable wiring.

In the present improved construction, the costly two-part terminal-block of prior construction has been dispensed with and the entire electrical equipment of the sewing machine may be assembled as a unit apart from the machine and attached to the machine as a final step in the building and mounting of the machine, or the machine may be sold at a reduced price without the electrical equipment.

This has been made possible, in part, by providing a simplified terminal housing, the major portion of which is formed as an integral part of the motor casing, within which all of the various electrical connections are easily and permanently made. A simple lining of insulating material provides the necessary secondary insulation between the electric conductors and the motor casing and removable cover completes the closing of the housing after the electrical connections have been made.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the accompanying drawings, Figure 1 is a rear elevation of a sewing machine and a portion of its supporting cabinet, embodying the present invention.

Fig. 2 is a rear view, partly in section, of the sewing machine driving motor shown in Fig. 1, including the improved terminal housing later to be described, Fig. 3 is a bottom view of the motor with the cover of the terminal housing removed and the sheet of secondary insulating material extended and broken away.

Fig. 4 is a perspective view of the removable cover of the terminal housing.

Fig. 5 is an inverted perspective view of a sheet of insulating material adapted to be placed in the terminal housing, as shown in Fig. 3, and thereafter folded, as indicated in dotted lines, to afford an insulating lining for the terminal housing and its removable cover.

Fig. 6 is a detail sectional view taken substantially on line 6—6 of Fig. 3 showing a portion of the motor casing and the improved terminal housing.

Fig. 7 is a detail plan view of a portion of the sewing machine cloth-plate showing a construction which permits the motor-controller wire to extend through the cloth-plate without being disconnected from either the motor or the controller.

Fig. 8 is a sectional view taken on the line 8—8 of Fig. 7.

Fig. 9 is a diagrammatic view illustrating the complete electrical system which is adapted to be assembled as a unit and later applied to a sewing machine.

Referring more specifically to the drawings, the invention is disclosed as comprising a unitary electrical system including a machine-driving motor M, an illuminating lamp L, a motor-controller C, a terminal box or housing H carried by the motor and within which the various electrical connections are made, and a lead-in electrical conductor P comprising wires $p^1$ and $p^2$ each having one end extending into the terminal box and its other end adapted to be connected to a suitable source of electrical energy as by means of a connector plug $p^3$.

As shown in Fig. 1, the lamp L and motor M are adapted to be secured to a sewing machine head S, and the motor-controller may be detachably mounted within a cabinet A, which supports the sewing machine head, for knee operation. If desired the motor-controller may be placed on the floor for foot operation as is well understood. When attached to the machine, the motor may be connected with the combined belt- and handwheel of the machine by the usual driving belt B.

Means for detachably supporting a motor-controller in a sewing machine cabinet is disclosed in United States patent to H. J. Goosman et al., No. 2,055,432, Sept. 22, 1936, and inasmuch as the specific construction and mounting of the motor-controller form no part of this invention, detailed illustration and description thereof is deemed unnecessary.

The motor M comprises a main frame 1, within which the field-coils f are mounted, and end bonnets 2 and 3 which afford bearings for the armature shaft 4. The end bonnet 2 is provided with an extension 5 (see Figs. 1 and 3) having a vertical rib 6 adapted to be fitted to a seat 7 on the upright standard 8 of the sewing machine and held thereto by a bolt 9. Thus the motor is removably secured to the sewing machine head.

The lamp L is removably secured to the overhanging arm 10 of the sewing machine head by a bracket 11 having one end 11$^a$ clamped about the lamp and having its other end 11$^b$ fastened to the arm 10 by a screw 12. The lamp is supplied with electric current through a conductor E comprising wires $e^1$ and $e^2$, while the field-coils f of the motor M are energized through wires $f^1$ and $f^2$. The motor-controller C is connected to one end of an electrical conductor G which comprises wires $g^1$ and $g^2$ of which the former is connected to the line $f^2$ while the latter is connected to the line $p^2$ of conductor P.

Conductor E, which furnishes current to the lamp L, has its wires $e^1$ and $e^2$ connected respectively to the wires $p^1$ and $p^2$ of conductor P. A switch T is provided in line $e^2$ adjacent the lamp, whereby the flow of current to the lamp may be controlled independently of the motor and motor-controller. For convenience, all of these connections will be made with the motor M inverted as shown in Fig. 3. In Fig. 5 the insulating lining for the terminal housing also is shown inverted to agree with Fig. 3.

As hereinbefore indicated, an important feature of this invention is the construction of the terminal housing as an integral part of the motor-casing and the arrangement thereof whereby all of the electrical connections between the source of power, the motor, the motor-controller and the lamp may be easily made and eventually insulated and concealed. This has been effected by casting as integral parts of the end bonnet 2, a radially projecting L-shaped wall 13 which extends approximately one-half inch below the main body portion of the end bonnet and provides one end wall and a portion of one side wall of a terminal housing. Likewise, the end bonnet 3 is formed with a straight depending wall 14 which provides the other end wall of the terminal housing.

As shown most clearly in Fig. 3, all of the connections between the conductors P, E and G and the wires $f^1$ and $f^2$ are made within bounds of the end walls 13 and 14 and the connected ends of the wires are covered by so-called "solderless connectors" 15 of insulating material which are screwed upon the twisted ends of the wires.

To provide the necessary secondary insulation between the conductors and the motor casing, the terminal housing H is lined with a sheet of insulating material 16 which is shown detached in Fig. 5. One end portion 16$^a$ of this sheet is placed within the terminal housing in contact with the lower wall of the motor casing and the wires $f^1$ and $f^2$ are drawn through holes 16$^b$, 16$^c$ in the sheet. The other end portion 16$^d$ of the sheet is permitted to extend outwardly, as shown in Fig. 3 during the connecting of the wires. After the wires have been properly connected, the sheet is folded about the connections as shown in dotted lines in Fig. 5 and in full lines in Fig. 6. A sheet metal cover 17 is then placed upon the walls 13 and 14 and secured thereto by screws 18 extending through openings 17$^d$ in the cover and threaded into apertures 18$^a$ in the walls 13 and 14. This cover is shown in perspective in Fig. 4 and comprises a bottom wall 17$^a$, a side wall 17$^b$, which cooperates with the smaller portion of the wall 13 to close one side of the housing, and a side wall 17$^c$ which closes the other side of the housing.

As shown most clearly in Figs. 2 and 6, the sheet 16 of insulating material, when held in place by the cover 17, forms a lining for the terminal housing and affords the necessary secondary insulation. The conductors P, E and G pass through apertures in the depending walls 13 and 14 and are insulated therefrom by insulating bushings 19.

From the foregoing it will be perceived that this invention has provided a complete electrical system for sewing machines which may be assembled as a unit and later applied to a completed machine. Likewise it will be apparent that the invention has provided a simplified and inexpensive form of terminal housing within which all of the necessary electrical connections may be made, insulated and concealed.

To permit the unitary electrical system to be applied to a completed sewing machine, either the cabinet A or the sewing machine cloth-plate $x$ may be provided with an aperture to permit passage of the conductor G when the motor-controller C is placed in the cabinet. In Figs. 7 and 8 there is disclosed one convenient means whereby this may be accomplished. In those figures the cloth-plate $x$ of the machine is shown as provided with a substantially circular aperture 20 adapted to receive an insulating bushing 21 which is placed on the conductor G during the assembling of the unit. A radial slot 22 extends from an edge of the cloth-plate to the aperture 20 and permits the conductor G to be moved laterally into the aperture. A spring wire clip 23 maintains the bushing 21 in the aperture 22.

As is customary, the sewing machine is hinged to the top $a$ of the cabinet A and, when not in use, may be lowered into the cabinet through an opening, indicated by the dotted lines $a^1$, in the top.

Having thus set forth the nature of the invention, what I claim herein is:

1. A unitary electrical system for a sewing machine comprising a machine-driving motor having field-coils and a casing affording a terminal housing, an illuminating lamp, a motor-controller, a lead-in electrical conductor having one end extending into said terminal housing and its other end adapted to be connected to a source of power, electrical conductors having one end, respectively, connected to said field-coils, lamp and motor-controller and their other ends extending into said terminal housing, and means within said housing so connecting together said conductors that said motor, lamp and motor-controller are operatively connected with said source of power.

2. A unitary electrical system for a sewing machine comprising a machine-driving motor having field-coils and a casing affording a terminal housing, an illuminating lamp, a motor-controller, a lead-in electrical conductor having one end extending into said terminal housing and its other end adapted to be connected to a source of power, electrical conductors having one end, respectively, connected to said field-coils, lamp and motor-controller and their other ends extending into said terminal housing, means within said housing so connecting together said conductors that said motor, lamp and motor-controller are operatively connected with said source of power, and a switch in one of said conductors for controlling said lamp independently of said motor and controller.

3. An electrical system adapted to be connected to a sewing machine as a unit, comprising a machine-driving motor having field-coils, a terminal housing on said motor, a work-illuminating lamp, a motor-controller, a lead-in electrical conductor having one end extending into said terminal housing and its other end adapted to be connected to a source of power, and electrical conductors having ends connected, respectively, to said field-coils, lamp and motor-controller and their other ends extending into said terminal housing and connected with said lead-in conductor so that said motor, lamp and motor-controller are operatively connected with said source of power.

4. A unitary electrical system for a sewing machine comprising a machine-driving motor having field-coils and a casing including a main frame and complemental end bonnets having radially projecting walls, a removable cover cooperating with said walls to provide a substantially closed terminal housing, an insulating lining within said housing, an illuminating lamp, a motor-controller, a lead-in electrical conductor having one end extending into said terminal housing and its other end adapted to be connected to a source of power, electrical conductors having ends connected, respectively, to said field-coils, lamp and motor-controller and their other ends extending into said terminal housing, and connected with said lead-in conductor so that said motor, lamp and motor-controller are operatively connected with said source of power, and a switch in one of said conductors for controlling said lamp independently of said motor and controller.

5. In combination with a sewing machine and a support therefor, a driving motor removably secured upon the machine and provided with a terminal housing, field-coils, and electrical conductors connected to said filed-coils and extending into said housing, a lamp removably secured upon said machine, a motor-controller secured to said machine support, electrical conductors extending from said lamp and controller into said terminal housing, a lead-in electrical conductor having one end extending into said terminal housing, said conductors being permanently connected together within said terminal housing to render said motor, lamp and controller operative simultaneously.

6. In an electric motor having a main casing and complemental end bonnets, opposed walls projecting radially from said end bonnets, and a cover including a bottom wall and projecting side walls, cooperating with the walls projecting from said end bonnets to form a substantially closed terminal housing on said motor.

7. In an electric motor having a main casing and complemental end bonnets, opposed walls projecting radially from said end bonnets, said walls being provided with apertures for the passage of electrical conductors which are adapted to be connected together, and a cover including a bottom wall and projecting side walls which cooperate with the walls projecting from said end bonnets to form a substantially rectangular closed terminal housing for the connected ends of said electrical conductors.

8. In an electric motor having a main casing and complemental end bonnets, opposed walls projecting radially from said end bonnets, said walls being provided with apertures for the passage of electrical conductors which are adapted to be connected together, a cover including a bottom wall and projecting side walls which cooperate with the walls projecting from said end bonnets to form a substantially rectangular closed terminal housing for the connected ends of said electrical conductors, and a single sheet of folded insulating material lining said terminal housing and affording a secondary insulation between said conductors and the motor casing.

DONALD D. WAY.